United States Patent [19]

Dossin

[11] 4,299,418
[45] Nov. 10, 1981

[54] DEVICE FOR GUIDING A LATERAL PART OF A FENDER ON AN AUTOMOBILE VEHICLE

[75] Inventor: Jacques Dossin, Courbevoie, France

[73] Assignees: Automobiles Peugeot; Societe Anonyme Automobiles Citroen, both of Paris, France

[21] Appl. No.: 87,333

[22] Filed: Oct. 23, 1979

[30] Foreign Application Priority Data

Nov. 6, 1978 [FR] France .................................. 78 31315

[51] Int. Cl.³ .............................................. B60R 19/08
[52] U.S. Cl. ....................................... 293/126; 293/154
[58] Field of Search ................ 293/126, 120, 154, 155

[56] References Cited

U.S. PATENT DOCUMENTS 2,691,545 10/1954 Lyon ..................................... 293/126

FOREIGN PATENT DOCUMENTS 2361213  6/1975  Fed. Rep. of Germany .
2164249  7/1973  France .
2198433  3/1974  France .
2345314 10/1977  France .

Primary Examiner—Joseph F. Peters, Jr.
Assistant Examiner—John A. Carroll
Attorney, Agent, or Firm—Burns, Doane, Swecker & Mathis

[57] ABSTRACT

The device is provided for improving the guiding of the lateral parts of a bumper and preventing the lateral parts from bearing against the fender of the vehicle, which occurs in conventional devices. The device comprises a case which is fixed to the fender and has a lateral wall which has a shape which conforms to the shape of the corresponding lateral part of the bumper and an inner end. Sufficient clearance is provided between the end of the lateral part of the bumper and the inner end of the case to allow the movement of the bumper inwardly of the case.

4 Claims, 3 Drawing Figures

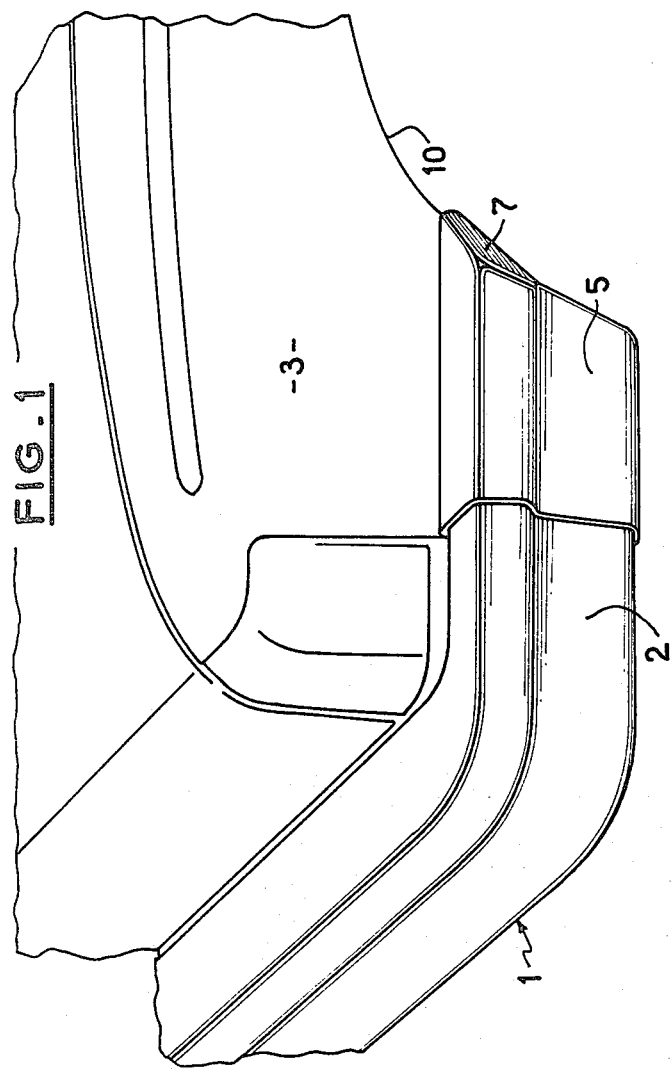
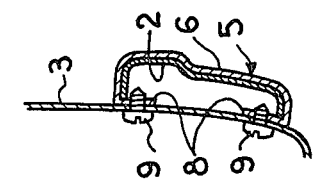
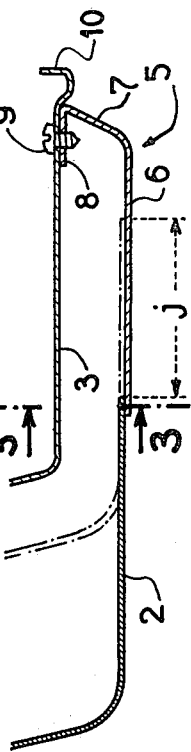

DEVICE FOR GUIDING A LATERAL PART OF A FENDER ON AN AUTOMOBILE VEHICLE

DESCRIPTION

The present invention relates to the guiding of the lateral parts of a bumper on an automobile vehicle.

It is known that on an automobile vehicle it is advantageous to mount the bumpers in such manner that they are longitudinally movable to a certain extent while absorbing energy so as to avoid damaging the body, the arrangement being such that they thereafter resume their initial position.

Such a mounting is effective if the shock occurs in a direction parallel to the longitudinal axis of the vehicle. On the other hand, if the shock occurs obliquely relative to this longitudinal axis, the lateral parts of the bumpers may damage the fenders of the body. This is why there have already been proposed (French Pat. No. 73 31 047 or DT-OS No. 23 61 213) guide devices comprising a spacer member fixed to the fender and cooperating with a slideway fixed to the inner side of the lateral parts of the bumpers. Unfortunately, these devices imperfectly perform their function, since the lateral parts of the bumpers are capable of pivoting more or less about the spacer member so that they are capable of bearing against the fender and/or producing a jamming which opposes the operation of the bumpers and in any case the return thereof to the initial position.

An object of the invention is to provide a guide means which is particularly simple and effective and results in an excellent finish from the aesthetic point of view.

The invention provides means for guiding, relative to a fender of an automobile vehicle, a lateral part of a bumper. This guide means comprises a case fixed to the fender and in which is engaged the end portion of the lateral part of the bumper. This case has a lateral wall which conforms to the shape of the bumper, an inner end which faces the end of the lateral wall of the bumper and flanges for fixing the case to the fender, there being a clearance between said end and the inner end of the case.

One embodiment of the invention is described in the ensuing description with reference to the accompanying drawing in which:

FIG. 1 is a partial perspective view of the front left part of a vehicle;

FIG. 2 is a sectional view taken in a horizontal plane of the lateral part of the bumper;

FIG. 3 is a vertical sectional view taken on line 3—3 of FIG. 2.

FIG. 1 shows a part of a vehicle, and in particular the end of a front bumper 1, which comprises a lateral part 2 which extends rearwardly of the vehicle along the front fender 3.

The end 4 of the bumper is, in the normal position, lightly engaged in a case 5. The case 5 has a lateral wall 6 which conforms to the shape of the bumper, a rear inner end 7 and flanges 8 whereby it is fixed to the fender 3 by means of screws 9.

A minimum clearance (j) is provided between the rear end of the bumper and the inner end 7 of the case 5 to allow the rearward travel of the bumper. In this movement, there is no risk of jamming or damage to the fender 3, since the bumper is perfectly guided between the lateral wall 6 of the case 5 and the flanges 8.

It is of interest to note that the cases 5 give a very good appearance, it being possible to arrange that the end 7 have the profile of the wheel opening 10 of the fender.

Further, the case 5 participates in the lateral protection of the fender 3.

It is obvious that the foregoing arrangement is also applicable to the rear bumper and that the case may be made from any suitable material such as metal or plastics material.

Having now described my invention what I claim as new and desire to secure by Letters Patent is:

1. A device for guiding a lateral part of a bumper, said bumper being of the type adapted to absorb energy by moving longitudinally of a vehicle fender and thereafter resuming the initial position, said device comprising a case and means for fixing the case directly on the fender, the lateral part of the bumper having an end portion which is engaged in the case, a clearance being provided between an end of the end portion of the lateral part of the bumper and an inner end portion of the case, said lateral part of the bumper being guidedly movable in the case to a predetermined extent substantially equal to said clearance in a direction longitudinally of the fender such that damage to the case is minimized.

2. A device as claimed in claim 1, wherein the case comprises a lateral wall which conforms to the shape of the lateral part of the bumper and flanges which are part of said means for fixing the case on the fender.

3. A device as claimed in claim 2, wherein the lateral part of the bumper is guided between said lateral wall and said flanges of the case.

4. A device as claimed in claim 2, wherein the inner end portion of the case has a shape which conforms to the profile of a wheel opening of the fender.

* * * * *